US011263992B2

(12) United States Patent
Martinez et al.

(10) Patent No.: US 11,263,992 B2
(45) Date of Patent: Mar. 1, 2022

(54) PLURAL DISPLAY PLURAL INFORMATION HANDLING SYSTEM SHARING

(71) Applicant: Dell Products L.P., Round Rock, TX (US)

(72) Inventors: Juan Manuel Martinez, Austin, TX (US); Walter Kemp, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 61 days.

(21) Appl. No.: 16/295,044

(22) Filed: Mar. 7, 2019

(65) Prior Publication Data
US 2020/0286442 A1 Sep. 10, 2020

(51) Int. Cl.
G09G 5/00 (2006.01)
G06F 3/14 (2006.01)

(52) U.S. Cl.
CPC ........... G09G 5/006 (2013.01); G06F 3/1423 (2013.01); G06F 3/1454 (2013.01); G09G 5/005 (2013.01); G09G 2320/0686 (2013.01); G09G 2320/08 (2013.01); G09G 2340/0442 (2013.01)

(58) Field of Classification Search
CPC .... G09G 5/006; G09G 5/005; G09G 2354/00; G09G 2340/00; G09G 2360/00; G06F 3/1423; G06F 3/1454
USPC .............................. 345/204, 1.1, 1.2, 2.1, 2.3
See application file for complete search history.

(56) References Cited

U.S. PATENT DOCUMENTS

| 6,112,513 | A | 9/2000 | Catt |
| 6,381,644 | B2 | 4/2002 | Munguia et al. |
| 6,643,124 | B1 | 11/2003 | Wilk |
| 7,613,927 | B2 | 11/2009 | Holovacs |
| 7,802,261 | B2* | 9/2010 | Cha .................. H04L 29/06027 709/201 |
| 7,890,677 | B2 | 2/2011 | Chandrasekhar et al. |
| 8,027,992 | B2* | 9/2011 | Blake ........................ G06F 8/61 707/769 |
| 8,624,731 | B2* | 1/2014 | Dearborn ................ G06F 1/165 340/5.1 |
| 2004/0130568 | A1* | 7/2004 | Nagano ............ H04N 21/64792 715/733 |
| 2005/0275603 | A1* | 12/2005 | Park ........................ G06F 3/14 345/1.1 |
| 2012/0236045 | A1* | 9/2012 | Tamura ................. G06F 3/1423 345/690 |
| 2013/0204401 | A1* | 8/2013 | Yamaguchi ............ G05B 11/01 700/17 |

(Continued)

Primary Examiner — Jimmy H Nguyen
(74) Attorney, Agent, or Firm — Zagorin Cave LLP; Robert W. Holland

(57) ABSTRACT

Display status agents executing on plural information handling systems coordinate presentation of visual images at plural displays by plural information handling systems through a display status memory external to the plural information handling systems, such as at a network location, a docking station or the displays. By referencing the display status memory, each display status agent determines information handling systems interfaced with each display and selects displays to present visual information based upon end user preferences to minimize manual interactions by an end user to accomplish a desired display presentation configuration.

11 Claims, 6 Drawing Sheets

(56) References Cited

U.S. PATENT DOCUMENTS

| | | | | |
|---|---|---|---|---|
| 2014/0019873 A1* | 1/2014 | Gupta | ................... | G06F 9/451 |
| | | | | 715/744 |
| 2014/0229518 A1* | 8/2014 | Wang | ................... | H04L 67/38 |
| | | | | 709/201 |
| 2018/0316379 A1* | 11/2018 | Chang | ................... | H04B 1/401 |

* cited by examiner

PLURAL DISPLAY PLURAL INFORMATION HANDLING SYSTEM SHARING

BACKGROUND OF THE INVENTION

Field of the Invention

The present invention relates in general to the field of information handling system display management, and more particularly to plural display plural information handling system sharing.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems generally present information as visual images at a display. A typical information handling system has visual information created by an operating system or application executing on a central processor unit (CPU), and then formats the visual information for presentation at a display with a graphics processor unit (GPU). For example, the GPU defines pixel values that determine a color presented by each pixel of a display so that a visual image is presented as a cumulative effect of the pixels. Typically, the GPU provides the pixel values to a timing controller of the display with a resolution that matches the resolution of the display, i.e., the size of the array of pixels of the display, such as High Definition or Ultra High Definition. The timing controller scans the pixel values across the pixels in a rapid manner that presents to the human eye a composite visual image.

Improvements in display technology over time have resulted in an ability by most information handling systems to present visual images simultaneously at plural displays with fine resolutions. For example, a typical desktop information handling system has two or more ports interfaced with a GPU to support simultaneous presentation of visual images at plural peripheral displays. Portable information handling systems typically integrate a display in a portable housing that also presents visual images. Advantageously, an end user may interact with plural displays through a single information handling system for a more comprehensive understanding of available information, such as by viewing multiple documents or interacting with multiple presented application user interfaces across plural displays simultaneously. For instance, a single information handling system may separately couple to plural displays with plural cables and then present a common desktop across both displays. Similarly, a docking station might support plural peripheral displays so that a portable information handling system can couple to the docking station through a single cable to interact with the plural peripheral displays and thus have a common desktop across the plural peripheral displays and an integrated display.

One difficulty that can arise when interacting with plural displays is that plural visual information sources may be simultaneously available at one or more of the plural displays, thus essentially forcing the display to select which visual source to present. For example, an end user arriving at a cubicle with a desktop information handling system presenting visual images at plural displays may want to instead use a portable information handling system with the peripheral displays. Generally, a peripheral display will automatically present visual information of the last source that couples to the peripheral display, so that an end user who couples a display cable between a portable information handling system and a single peripheral display will achieve the likely intended result of viewing portable information handling system output through the peripheral display. If, however, the portable information handling system couples to the peripheral display through a docking station, all of the peripheral displays interfaced with the docking station may convert to output visual information of the portable information handling system, a result that may or may not be desired by the end user. For instance, the end user may want to keep visual images of the desktop information handling system active at one or more of the peripheral displays, such as by presenting visual information of the portable information handling system at only one display.

If a peripheral display changes its visual source unexpectedly, such as upon coupling a portable information handling system to a docking station, an end user often faces a struggle to get each of the peripheral displays to show visual images of a desired source. For instance, in the example above, if two peripheral displays change to present visual images of a portable information handling system source, the end user generally has to manually adjust one of the peripheral displays to instead present visual images of the desktop information handling system source by deselecting the portable information handling system. The desktop information handling system likely remains configured to show visual images at both peripheral displays so the end user must then disable the desktop information handling system from presenting visual information at both peripheral displays; otherwise the desktop information handling system may attempt to present visual images at a peripheral display that shows visual images of the portable information handling system. In addition, once the portable information handling system has configured to present visual information at plural displays, if the end user changes the output presented at one of the plural displays away from the portable information handling system, then the portable information handling system typically has to be manually reconfigured so that it does not attempt to present visual information at all of the plural displays. Confusion relating to presentation of visual images may increase in situations where one or more peripheral displays have their orientation shifted between landscape and portrait modes, or where the transfer of visual information includes a wireless medium at some point in the communication of visual images to the peripheral displays.

SUMMARY OF THE INVENTION

Therefore, a need has arisen for a system and method which automates management of presentation of visual information between plural information handling systems across plural peripheral displays.

In accordance with the present invention, a system and method are provided which substantially reduce the disadvantages and problems associated with previous methods and systems for managing presentation of visual information at plural displays. Information handling systems coordinate control of presentation across plural displays by reference to an external display status memory during interactions with the plural displays. Display status agents executing across plural information handling systems coordinate selection of a visual information source if plural visual information sources are available at a display, such as by referencing an end user's preferences for a detected configuration.

More specifically, plural information handling systems process information with processing components that output visual information for presentation as visual images at plural peripheral displays. Upon detecting a change in peripheral display status, a display status agent executing on each information handling system, such as on a central processing unit (CPU) or graphics processing unit (GPU), updates display status stored in an external memory shared with display status agents of other information handling systems that interact with the plural peripheral displays. By retrieving a display status for each information handling system coupled to a display, the display status agent determines from user preferences or other predetermined conditions which of the available peripheral displays the information handling system should control for presenting visual images. For instance, a portable information handling system that couples to a docking station having two peripheral displays will retrieve the display status for the two peripheral displays from the display status memory and apply the display status to determine which of the peripheral displays to control. In an example embodiment, the portable information handling system may control one peripheral display while leaving the other peripheral display for presentation of visual information from an existing connection with a desktop information handling system. The selection of which information handling system presents visual information at each peripheral display may be directly coordinated between all information handling systems interfaced with each peripheral display based upon end user preferences, such as historical use patterns.

The present invention provides a number of important technical advantages. One example of an important technical advantage is that plural displays interact with plural information handling systems in an automated manner to adapt presentation of visual information to an end user's desired result. A visual image source is selected for each of plural peripheral displays to present visual images by sharing display and visual source status, such as at a network or cloud location. Each of plural information handling systems interfaced with plural peripheral displays updates a display status so that an automated configuration of the peripheral display visual information presentation is provided. The display status may include portrait and landscape orientation of each peripheral display so that a visual information source configures to match the visual image presentation orientation by reference to the display status. End user preferences stored with the display status aid automated visual information presentation configuration based upon historical usage patterns and/or saved preferences.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Plural information handling systems coordinate presentation of visual images at plural peripheral displays through a shared external display status memory. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
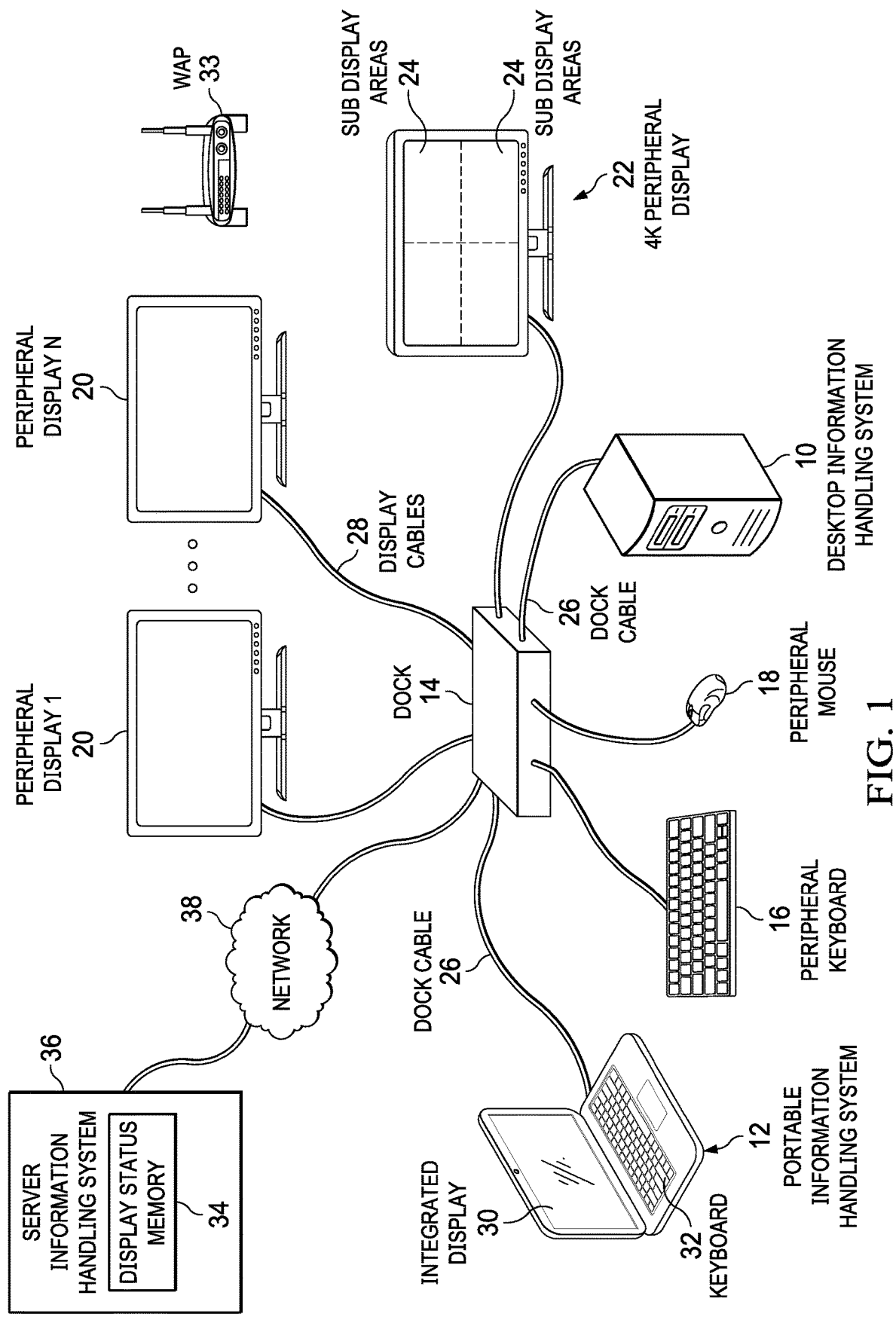
FIG. 1 depicts plural information handling systems interfaced with plural peripheral displays and an external display status memory to coordinate selection of visual information for presentation at each of the plural peripheral displays.

Referring now to FIG. 1, plural information handling systems interface with plural peripheral displays and an external display status memory to coordinate selection of visual information for presentation at each of the plural peripheral displays. In the example embodiment, a home or enterprise desktop workspace includes a desktop information handling system 10 and a portable information handling system 12 that interact through a docking station 14 with a variety of peripheral devices, including displays, a keyboard 16 and mouse 18. Docking station 14 offers convenient coordination of communication between devices in the desktop environment so that an end user can bring portable information handling system 12 into communication with peripheral devices as desired. In the example embodiment, first and second high definition peripheral displays 20 and an ultrahigh definition display 22 interface through cables with docking station 14 to present visual images from visual information generated at information handling systems 10 and 12. Ultrahigh definition display 22 includes four subdisplay areas 24 that may each present visual images equal to a high definition display. In the example embodiment, docking cables 26 are USB Type C interfaces and display cables 28 are DisplayPort cables; however, in alternative embodiments alternative types of cables or wireless interfaces may be used.

Portable information handling system 12 includes an integrated display 30 and integrated keyboard 32 within a portable housing so that an end user can interact with the system during mobile use free from external power and peripheral devices. For example, a wireless network interface card (WNIC) within portable information handling system 12 supports wireless network communications, such as with a wireless local area network (WLAN) supported by a wireless access point (WAP) 33. Although mobile use provides convenience to an end user, such as by allowing interactions in meeting rooms or while traveling, integrated display 30 and integrated keyboard 32 generally have a smaller size than typical peripheral displays and keyboards so that an end user will generally interface with peripheral displays and keyboards if available and convenient. Docking station 14 offers a convenient interface to such desktop resources by interfacing docking cable 26 with portable information handling system 12.

One difficulty that arises during docking of portable information handling system 12 and docking station 14 is that desktop information handling system 10 also interacts with peripheral devices through docking station 14 so that a conflict may arise when both systems become active. Typically, peripheral displays 20 and 22 present visual information of the last information handling system to interface with the peripheral display. Thus, if desktop information handling system 10 is presenting visual information at peripheral displays 22 and 24 when portable information handling system 12 interfaces with docking station 14, a likely default configuration is that all of the peripheral displays will automatically convert to present visual information of portable information handling system 12 instead of desktop information handling system 10. A similar problem arises if portable information handling system 12 interfaces directly to a peripheral display 20 or 22 through a display cable 28 and that peripheral display 22 is also coupled by another display cable 28 to desktop information handling system 10. Further, desktop information handling system 10 can override presentation of visual information by portable information handling system 12 if desktop information handling system 10 powers up from an off or standby state after portable information handling system 12 presents visual information at a peripheral display 20.

In order to coordinate presentation of visual information at peripheral displays 22 and 24 when plural information handling systems are interfaced to the peripheral displays, a status of each peripheral display 22 and 24 is stored at an external display status memory 34, such as at a server information handling system 36 accessed through a network 38. For example, as each information handling system 10 and 12 couples with each peripheral display 20 and 22, an identifier of the peripheral display is retrieved to the information handling system and used to access a display status of each peripheral display from display status memory 34. In one example embodiment, the display status includes identifiers of all information handling systems interfaced with each display, the orientation of the display (such as landscape or portrait), any subdisplay areas 24 defined in the display, other peripheral displays in proximity, such as that share a common docking station 14, and end user preferences associated with the display. Based upon the retrieved display status, an information handling system that interfaces with the display determines whether or not to present visual images at the display. For instance, if portable information handling system 12 couples to a peripheral display 20 and determines from retrieved display status that desktop information handling system 10 is coupled to the peripheral display 20, then the two information handling systems coordinate which should control presentation of visual information at the peripheral display, such as through network 38 using identifiers retrieved from display status memory 34. Alternatively, the last of the information handling systems to interface with the peripheral display determines based upon the display status whether it should present visual information at the display or leave the other information handling system in control of presentation of visual images at the display. In the example embodiment, display status memory 34 is in a network location, such as a cloud location, however, in alternative embodiments, display status memory 34 may be stored in a docking station 14, within one or more of peripheral displays 20, at wireless access point 33 or at any other shared memory location accessible by the information handling systems. In one example embodiment, a desktop information handling system coupled to the peripheral displays may act as a central display status memory for the peripheral displays that all portable information handling systems reference as the external display status memory 34.

As an example, desktop information handling system 10 powers up to interface with peripheral displays 20 and 22 for presentation of visual information. Upon interfacing with peripheral displays 20 and 22, desktop information handling system 10 retrieves the display status of each peripheral display 20 and 22 from display status memory 34, determines that it is the only information handling system coupled to the peripheral displays 20 and 22, establishes an active interface to present visual information, and updates display status memory 34 to store its status as actively presenting visual information. Subsequent to the presentation of visual information by desktop information handling system 10, portable information handling system 12 interfaces with peripheral displays 20 and 22 through docking station 14 and retrieves the display status of the peripheral displays from display status memory 34. If a preferred display presentation configuration exists, such as stored in the display status memory 34, portable information handling system 12 controls peripheral displays indicated by the preferred configuration and communicates the transfer of control to desktop information handling system 10, which reconfigures its presentation of visual information accordingly. If a preferred display presentation does not exist, portable information handling system 12 controls selected of the peripheral displays based upon default rules or other predetermined factors. Upon disconnection of an information handling system from the peripheral displays, an update to the display status memory 34 triggers a message to information handling systems that remain coupled to the peripheral displays so that control of presentation of visual information transitions to the other information handling systems.

As a specific example, portable information handling system 12 upon coupling to docking station 14 retrieves display status from display status memory 34 to determine that desktop information handling system 10 controls all of peripheral displays 20 and 22. In response, portable information handling system 12 takes control of peripheral displays 20 to present visual images at them and leaves desktop information handling system 10 to present visual images at peripheral display 22. In an alternative embodiment, portable information handling system 10 may control all or none of the peripheral displays 22 and 24 based upon saved configurations or historical end user selection preferences that are set up as defaults. Portable information handling system 12 updates display status memory 34, which triggers an alert to desktop information handling system 10. In response, desktop information handling system 10 ceases presentation of visual information at peripheral displays 20 so that a ghost image unviewable by an end user is not generated by desktop information handling system 10. The updated display status may be provided to desktop information handling system 10 by an alert issued from logic at server information handling system 36 when a change is made at display status memory 34 or with a direct communication by portable information handling system 12 to desktop information handling system 10. Similarly, upon release of a peripheral display 20 by portable information handling system 12, notification to desktop information handling system 10 allows it to take control of presentation of visual information at peripheral displays 20. In one example embodiment, upon interfacing with a display, an information handling system retrieves the display orientation from the display status memory and applies the display orientation to determine an orientation for providing visual information to a display, such as in a landscape or portrait orientation.

Figure 2:
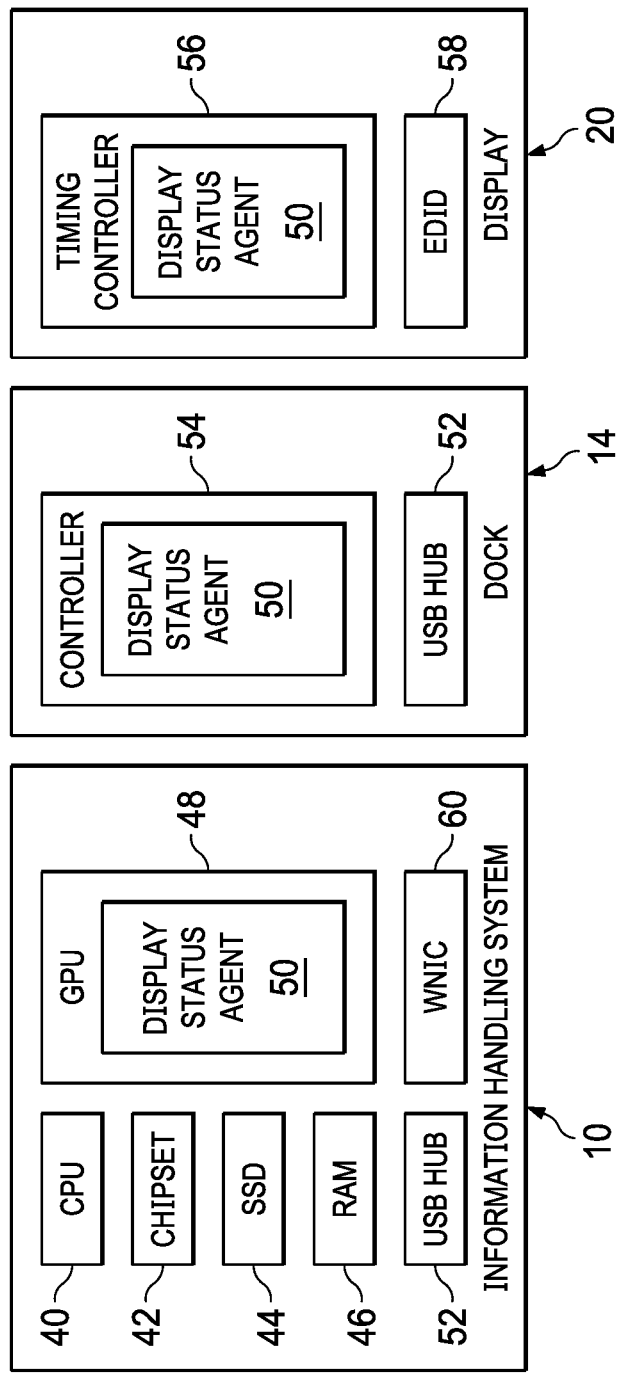
FIG. 2 depicts a block diagram of a system for coordination of selection of visual information for presentation at each of plural peripheral displays.

Referring now to FIG. 2, a block diagram depicts a system for coordination of selection of visual information for presentation at each of plural peripheral displays. In the example embodiment, display status memory 34 is a table of display unique identifiers that each have associated display status information, such as display orientation, subdisplay configurations, and connected information handling systems. Display status memory 34 may be stored in a database or other memory structure as a table or other format that is accessible by information handling system 10. Information handling system 10 is built from processing components that process information, such as by executing an operating system and/or applications that generate visual information for presentation at a display as visual images. In the example embodiment, a central processing unit (CPU) 40 executes instructions of an operating system and/or applications under the management of a chipset 42, such as by retrieving the instructions from persistent non-transient memory of a solid state drive (SSD) 44 to a random access memory (RAM) 46. Visual information generated by CPU 40 is provided to a graphics processor unit (GPU) 48 for additional processing, such as creating pixel values that define the visual image presented by pixels of a display. A USB hub 52 interfaces with GPU 48 to send the pixel values to external devices though a display or docking station cable. Alternatively, a WNIC 60 provides the pixel values through a wireless interface, such as a high bandwidth 60 GHz wireless device.

In the example embodiment, docking station 14 includes a controller 54 that establishes communication between information handling system 10 and display 20 plus other peripherals, such as by routing information through a USB hub 52. Display 20 includes a timing controller 56 that scans pixel values received from a visual information source to pixels of a display panel for presentation of a visual image. An EDID flash memory 58 stores configuration information associated with display 20, such as in compliance with the Extended Display Identification Data (EDID) 1.4 format.

In order to coordinate display visual image control, a display status agent 50 executes on information handling system 10 to access display status memory 34 for reading and writing display status values. Display status memory 34 is, for example, stored in a "cloud" network location or, alternatively, in memory available on dock 14 or display 20, such as in the EDID flash memory. In one embodiment, display status agent 50 executes only on information handling systems 10 to interact with display status memory 34 upon interactions with a display 20. In such an embodiment, display status agent 50 executes as firmware of a GPU 48 or as a driver of an operating system running on CPU 40 to determine from display status memory 34 all connected information handling systems to the information handling system 10 can contact other connected information handling systems upon a change in display status. Alternatively, a display status agent 50 executes at the location of the display status memory 34 to initiate notifications of a change in display status from location of display status memory 34. For instance, display status agent 50 may run on controller 54 of docking station 14 or timing controller 56 to send alerts if a display status memory 34 has a change in display status.

Figure 3:
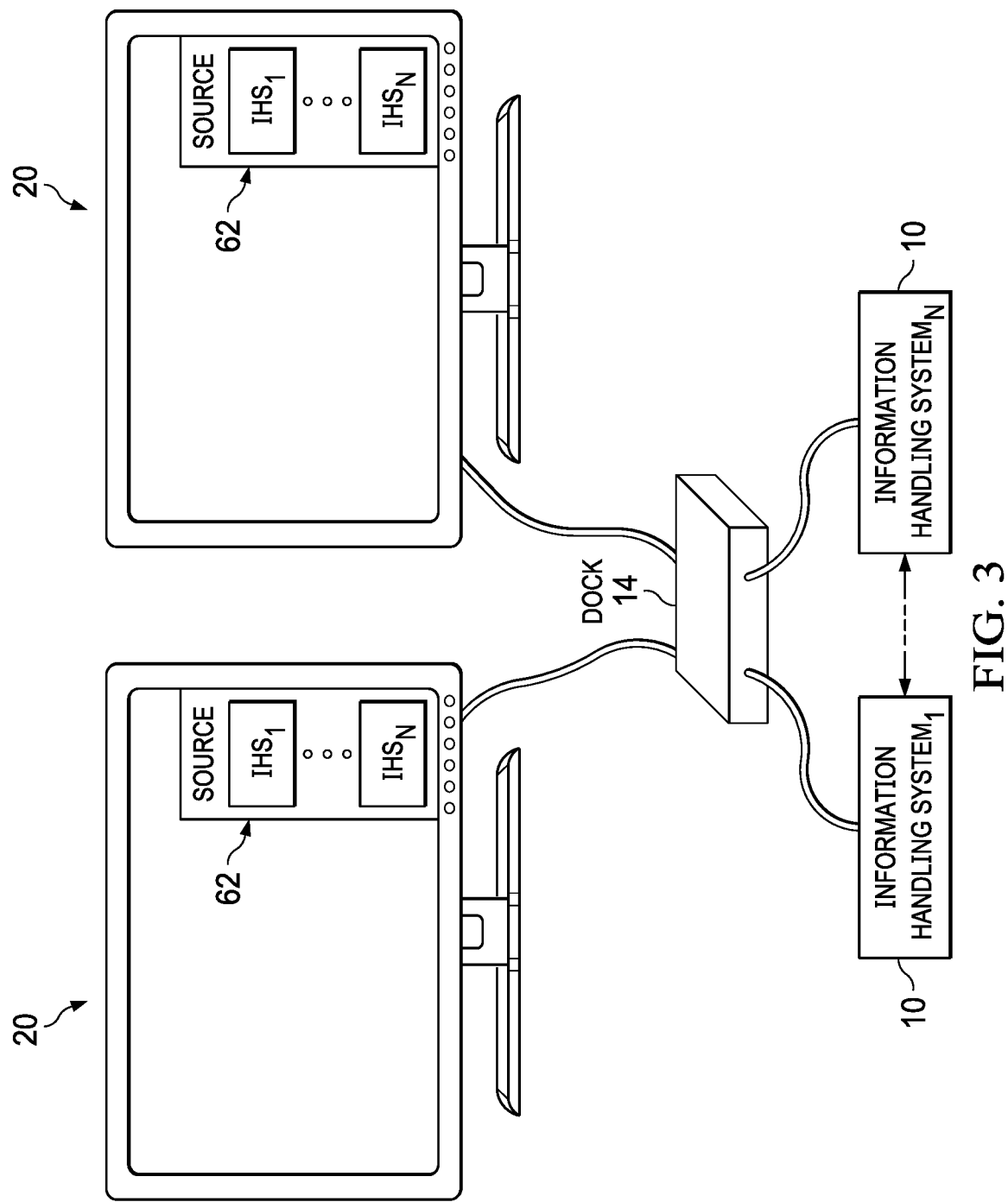
FIG. 3 depicts plural peripheral displays interfaced with plural information handling systems and presenting a visual information source selection window to coordinate presentation of visual information at each of the peripheral displays.

Referring now to FIG. 3, plural peripheral displays 20 interface with plural information handling systems 10 and present a visual information source selection window 62 to coordinate presentation of visual information at each of the peripheral displays 20. In the example embodiment, once an information handling system 10 retrieves display status and determines what peripheral displays 20 to control for presentation of visual information, the display status agent executing on the information handling system 10 generates source selection window 62. Source selection window 62 graphically depicts each of the information handling systems interfaced with each peripheral display 20 and allows an end user to change the visual information source through a graphical user interface. For example, the display status agent 50 creates an icon for each connected information handling system indicated by the display status memory so that an end user selects the icon to make that information handling system the source for the peripheral display 20. Upon selection of a visual information source, an update is made to the display status at the display status memory so that the selected information handling system can take over as the visual information source. In one embodiment, source selection window 62 includes visual information generated by each information handling system as part of the depicted icon. For instance, the visual information is transferred between the information handling systems so that the information handling system selected to present visual information at the peripheral display 20 can include visual images of other information handling systems as the icon used to select the information handling system to initiate presentation of visual images.

Figure 4A:
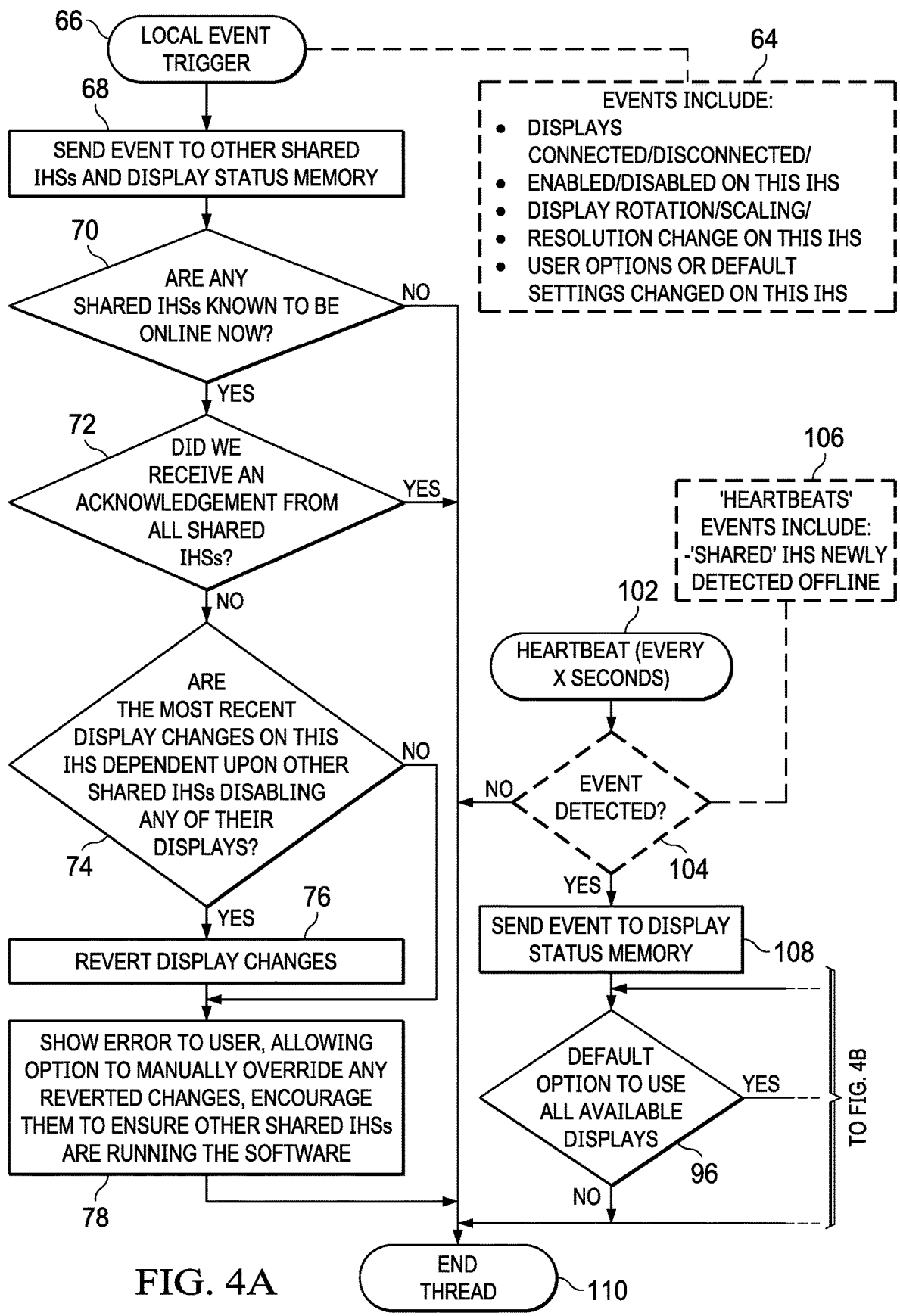
FIGS. 4A and 4B depict a flow diagram of a process for selection of a visual information source for presentation of visual information at each of plural peripheral displays interfaced with plural information handling systems.
Figure 4B:
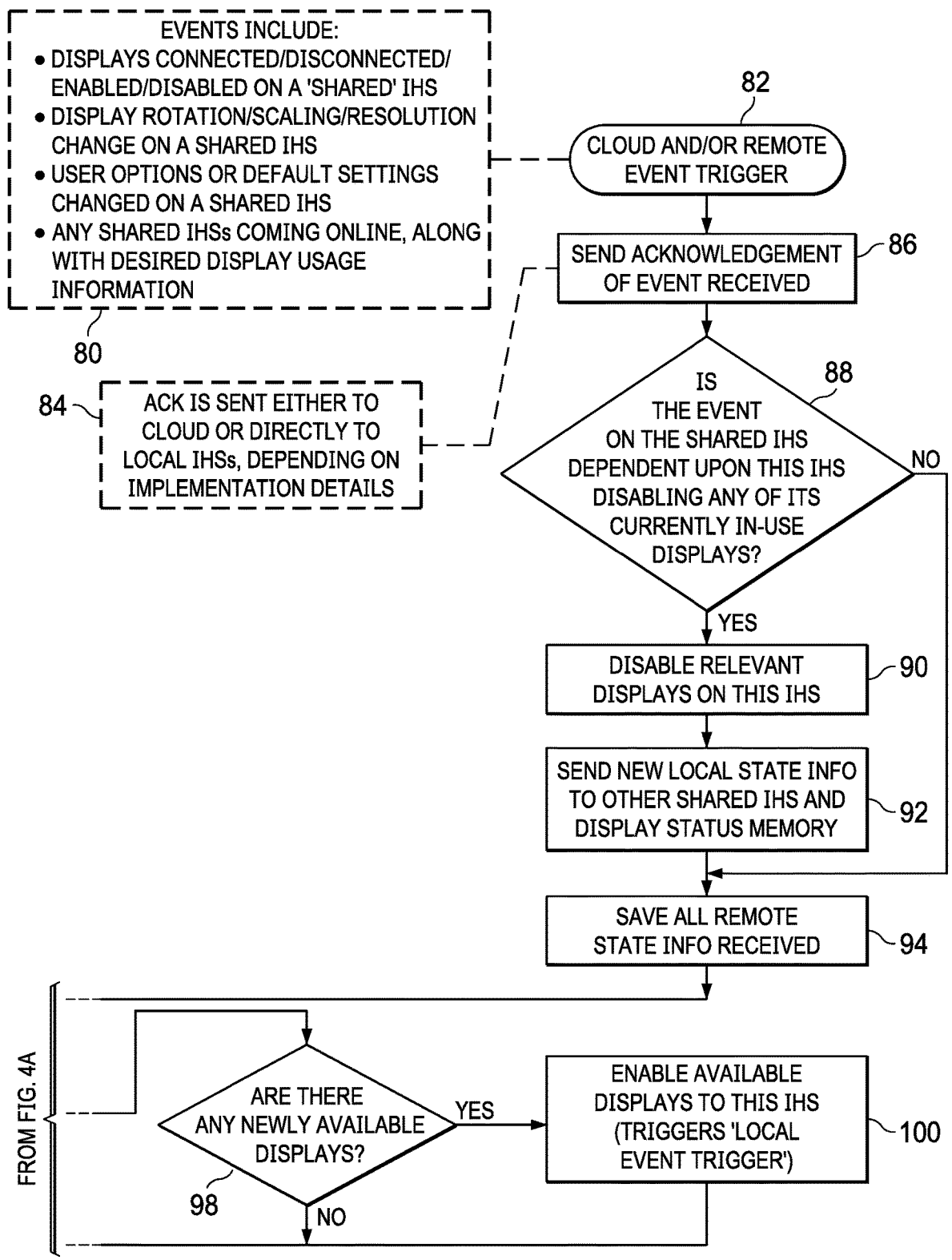

Referring now to FIGS. 4A and 4B, a flow diagram depicts a process for selection of a visual information source for presentation of visual information at each of plural peripheral displays interfaced with plural information handling systems. In the example embodiment, the process initiates when an information handling system detects a display event locally, receives a report of a display event from a display status memory, or performs a heartbeat check of the display status. At step 64 a display event occurs locally at an information handling system, such as connecting, disconnecting, enabling, disabling, rotating orientation or otherwise changing the configuration associated with a display, thus triggering a local event at step 66. The process continues to step 68 to send the display event to other shared information handling systems and the display status memory. At step 70, a determination is made of whether any information handling systems that share the detected display are interfaced through a network and/or coupled to the display. If not, the process ends at step 110. If other information handling systems interface with the display, the process continues to step 72 to determine if an acknowledgement is received from the shared information handling systems so that the change may be performed. If so the process ends at step 110. If at step 72 not all shared information handling systems respond to the event, the process continues to step 74 to determine if the detected display status change at the information handling system depends upon actions at other information handling systems, such as disabling presentation of visual information at the display by other shared information handling systems. If so, the process continues to step 76 to revert the display changes so that the other information handling system can be performed, such as with a network communication or manual configuration. At step 78 an error message is provided to the end user that allows a manual override of any reverted changes and a warning to have the display status agent installed on information handling systems that are not responding to the event. The process ends at step 110.

At step 80 an event is detected that is associated with an information handling system that shares a display, such as a display connect, disconnect, enable, disable, orientation rotation or other configuration change detected at a shared information handling system. At step 82, the event is reported to the information handling system through cloud notification issued from the display status memory or from the information handling system that detected the event. The process continues to step 86 where an acknowledgement of the event is sent to the source device that reported the event, such as by writing to the display status memory or send an ACK packet to the information handling system that detected the event, as indicated at step 84. At step 88 a determination is made of whether the reported event involves the information handling changing or adjusting its interactions with the display associated with the reported event. If not, the process continues to step 94. If a change in the display interactions is called for, the process continues to step 90 to disable the relevant configuration associated with the display, step 92 to send the new local status to the display status memory and other shared information handling systems and to step 94 to save the updated remote state information received related to the event. From step 94, the process continues to step 96 to perform configuration steps related to the event as described below.

At step 102, the information handling system performs a heartbeat detection at a regular interval to detect changes in configuration or other events. Upon initiation of a heartbeat at step 102 the process continues to step 104 to determine if a heartbeat event is detected, such as an interface established with a related information handling system through a network. If no heartbeat event is detected, the process ends at step 110. If a heartbeat event is detected at step 104, the process continues to step 108 to send the event to the display status memory. The process continues to step 96 where a determination is made if a default option is set to use all available displays. If so, the process continues to step 98 to determine if any newly available displays are detected and, if so, to step 100 to enable presentation of visual images by the information handling system in response to the local trigger. In various embodiments, newly detected displays sensed at a local trigger event may be used to present visual images by any of plural interfaced information handling systems based upon set preferences. The process ends at step 110.

Figure 5:
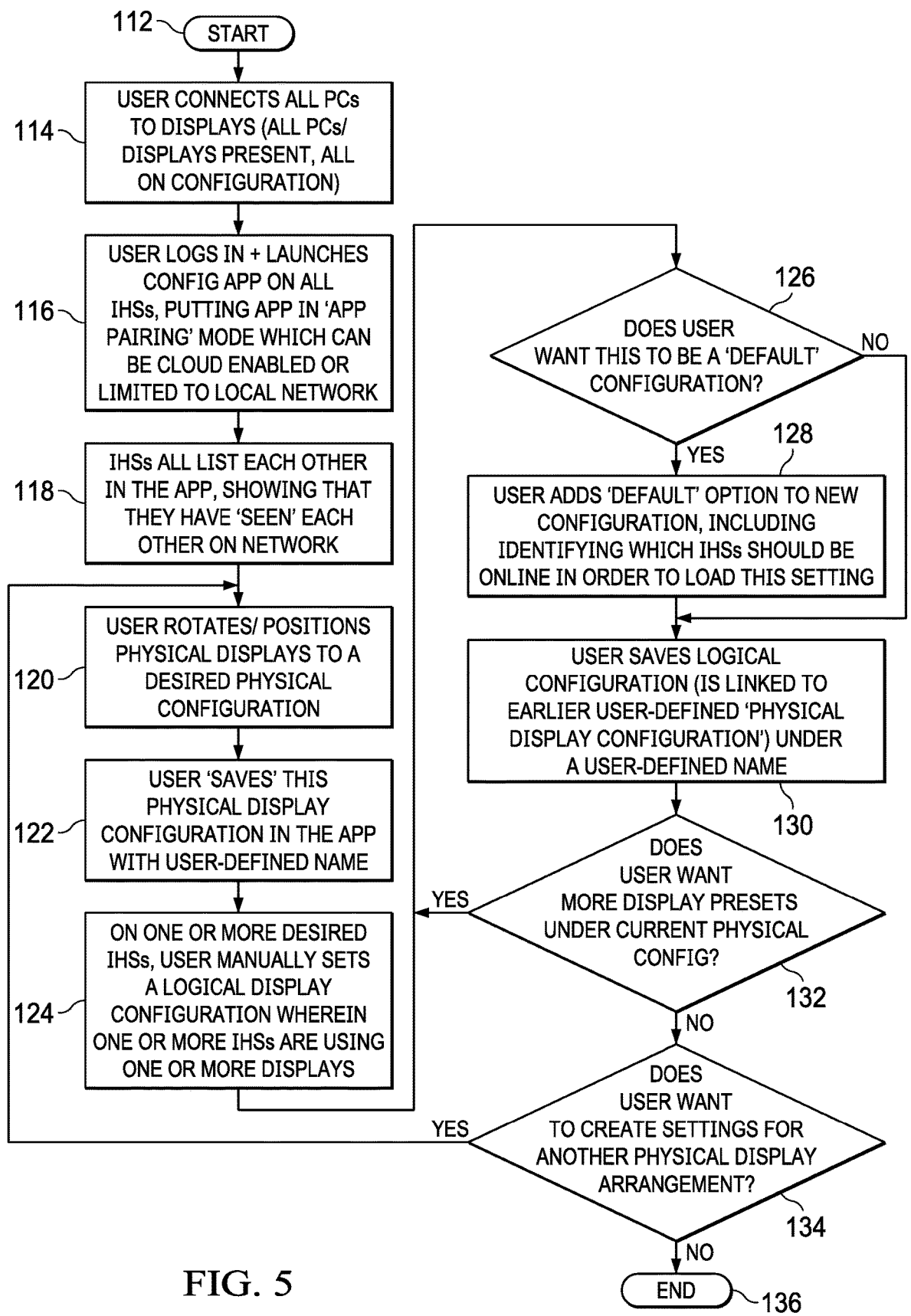
FIG. 5 depicts a flow diagram of a process for configuration of display status agents to select a configuration for presentation of visual information where plural information handling systems interface with plural peripheral displays.

Referring now to FIG. 5, a flow diagram of a process for configuration of display status agents to select a configuration for presentation of visual information where plural information handling systems interface with plural peripheral displays. The process starts at step 112 and at 114 an end user couples all available information handling systems to all available peripheral displays. At step 116, the end user logs into a configuration website, such as at a cloud location at which display status is stored. The cloud offers advantages as a location to store display status since status may be updated whether or not information handling systems are interfaced with displays. The configuration location installs and executes a display status agent at each information handling system to coordinate setting of default configurations. At step 118, each information handling system interfaces with the display status location so that every information handling system can list all information handling systems for which the peripheral displays will have a default setting. At step 120, the end user rotates the display to a desired orientation, such as portrait or landscape orientation, and at step 122 saves the orientation to the display status memory.

At step 124, at one or more information handling systems an end user manually selects one or more logical display configuration having one or more information handling systems interfaces with one or more peripheral displays. The logical display configuration is the combined resolution, alignment and rotation of peripheral displays as understood natively to each information handling system's operating system. The process continues to step 126 to determine if the end user desires a saved logical display configuration as a default configuration. If so the process continues to step 128 to add the default option to the new configuration with identification of which information handling systems should be on line to share this default setting. A default configuration setting is a list of one or more specific information handling systems online and connected to the peripheral displays where the last known active physical configuration of the information handling systems matches the list, such as active physical configurations saved in the display status memory. Generally an end user will want to save a default configuration for each physical setup that is likely to be created in normal use. At step 130, the end user saves the logical configuration under a name for subsequent use and modification. At step 132, a determination is made of whether a user has completed setup of peripheral display physical configurations and, if not, the process returns to step 124. Once all configurations are saved, the process continues to step 134 to determine if the end user wants to create additional display and information handling system configurations. If so the process returns to step 120; otherwise, the initial configuration process ends at step 136.

Although the present invention has been described in detail, it should be understood that various changes, substitutions and alterations can be made hereto without departing from the spirit and scope of the invention as defined by the appended claims.

What is claimed is:

1. A system for managing presentation of visual images at plural peripheral displays by plural information handling systems, the system comprising:

plural displays, each display operable to present visual images based upon visual information;
plural information handling systems, each information handling system having a non-transitory memory and a processor, each information handling system operable to generate the visual information and communicate the visual information to the plural displays;
a physical memory external to and interfaced with the plural information handling systems;
a display status memory stored in the physical memory and accessible by the plural information handling systems, the display status memory storing a display status for each of the plural displays;
a display status agent stored in the non-transitory memory on each of the plural information handling systems, the display status agent when executed on the associated processor causing the associated processor to report to the display status memory an interface established between one or more of the plural displays and the information handling system executing the display status agent; and
a display status user interface generated by the display status agent when executed on the associated processor causes the associated processor to depict each of the plural information handling systems interfaced with each of the plural displays;
wherein selections at the display status user interface determine which of the plural information handling systems control presentation of visual images at each of the plural displays.

2. The system of claim 1 wherein the display status agent when executed on the associated processor causes the associated processor to:
retrieve from the display status memory a status of the one or more of the plural displays in response to the interface, the status including other of the plural information handling systems interfaced with the one or more of the plural displays; and
apply the status to determine whether or not to present visual images at the one or more of the plural displays.

3. The system of claim 2 wherein the display status agent at each of the plural information handling systems coupled to one of the plural displays, when executed on the associated processor causes the associated processor to communicate to identify which of the plural information handling systems presents visual information at the one of the plural displays.

4. The system of claim 1 wherein the physical memory storing the display status memory comprises a flash memory at each of one or more of the plural displays.

5. The system of claim 1 wherein each display status agent when executed on the associated processor causes the associated processor to:
detect a predetermined event associated with one or more of the plural displays; and
in response to the predetermined event to present the display status user interface at all of the plural displays interfaced with the display status agent.

6. A method for managing presentation of visual information at a display, the method comprising:
interfacing a first information handling system to a first display;
in response to the interfacing, communicating a status of the first display from the first information handling system to a display status memory located in a physical memory external to the first information handling system;
retrieving from the display status memory the status of the first display;
selectively presenting visual images from the first information handling system at the first display based at least in part upon the retrieved status;
analyzing the retrieved status to determine a second information handling system interfaces with the first display;
analyzing the retrieved status to determine a second display interfaced with the second information handling system; and
in response to determining a second display interfaced with the second information handling system, automatically configuring the first information handling system to present visual images at only the first display and the second information handling system to present visual images at only the second display.

7. The method of claim 6 further comprising:
analyzing the retrieved status to determine a second information handling system interfaces with the first display; and
selecting the first or second information handling system to present the visual images based upon a priority stored in the display status memory.

8. The method of claim 6 wherein the physical memory having the display status memory comprises a memory located in the first display.

9. A method for managing presentation of visual information at a display, the method comprising:
interfacing a first information handling system to a first display;
in response to the interfacing, communicating a status of the first display from the first information handling system to a display status memory located in a physical memory external to the first information handling system;
retrieving from the display status memory the status of the first display; and
selectively presenting visual images from the first information handling system at the first display based at least in part upon the retrieved status;
wherein the display status comprises a network address of information handling systems interfaced with the first display, the method further comprising:
establishing communication between the first information handling system and a second information handling system included in the display status by reference to the network address; and
coordinating presentation of visual information at the first display with communication between the first and second information handling systems to select the first or second information handling system to present the visual information.

10. The method of claim 9 further comprising:
generating a display status user interface that depicts a display status of each information handling system interfaced with the first display; and
presenting the display status user interface with the information handling system selected to present the visual information at the first display.

11. The method of claim 10 wherein the display status user interface further comprises a depiction of all displays interfaced with each information handling system that interfaces with the first display.

* * * * *